(12) United States Patent
Lee et al.

(10) Patent No.: US 12,438,570 B2
(45) Date of Patent: Oct. 7, 2025

(54) WIRELESS DATA COMMUNICATION METHOD, COMPUTER PERIPHERAL DEVICE AND RECEIVER DEVICE

(71) Applicant: Razer (Asia-Pacific) Pte. Ltd, Singapore (SG)

(72) Inventors: Kah Yong Lee, Singapore (SG); Chee Oei Chan, Singapore (SG)

(73) Assignee: Razer (Asia-Pacific) Pte. Ltd, Singapore (SG)

( * ) Notice: Subject to any disclaimer, the term of this patent is extended or adjusted under 35 U.S.C. 154(b) by 406 days.

(21) Appl. No.: 17/923,026

(22) PCT Filed: Jun. 25, 2020

(86) PCT No.: PCT/SG2020/050364
§ 371 (c)(1),
(2) Date: Nov. 3, 2022

(87) PCT Pub. No.: WO2021/262084
PCT Pub. Date: Dec. 30, 2021

(65) Prior Publication Data
US 2023/0353191 A1    Nov. 2, 2023

(51) Int. Cl.
*H04B 1/715* (2011.01)
*H04B 1/7143* (2011.01)
(Continued)

(52) U.S. Cl.
CPC .......... *H04B 1/715* (2013.01); *H04B 1/7143* (2013.01); *H04W 72/0446* (2013.01); *H04W 72/0453* (2013.01)

(58) Field of Classification Search
CPC .... H04B 1/715; H04B 1/7143; H04B 1/7156; H04B 2001/7154; H04B 2201/71315;
(Continued)

(56) References Cited

U.S. PATENT DOCUMENTS 6,519,290 B1   2/2003  Green
6,973,133 B2   12/2005 Green
(Continued)

FOREIGN PATENT DOCUMENTS

CN      1943186 A    4/2007
CN    101401338 A    4/2009
(Continued)

OTHER PUBLICATIONS

Lim et al., "Design an infrared wireless optical mouse system and a dual-band infrared receiver," 2008 15th IEEE International Conference on Electronics, Circuits and Systems (2008), Abstract Only.
(Continued)

*Primary Examiner* — Ayaz R Sheikh
*Assistant Examiner* — Mang Boi Thawng
(74) *Attorney, Agent, or Firm* — Polsinelli PC

(57) ABSTRACT

Wireless data communication method, for communication between a computer peripheral device and a receiver device including transmitting a datastream from a computer peripheral device to a receiver device, with a wireless communication protocol which may operate with a first frequency band and a second frequency band. Each of the bands may be divided into a plurality of sub-bands, which may be further divided into frequency channels. During a first time slot, the operation frequency channel may be a first operation frequency channel selected according to a first frequency hopping sequence from the frequency channels of one sub-band of the first frequency band. During a second time slot, the operation frequency channel may be selected according to a second frequency hopping sequence from the frequency channels of one sub-band of the plurality of sub-bands of the second frequency band. Adjacent frequency channels of any of the frequency hopping sequences
(Continued)

may be of different sub-bands. A device implementing the method is also envisaged.

20 Claims, 7 Drawing Sheets

(51) Int. Cl.
*H04W 72/0446* (2023.01)
*H04W 72/0453* (2023.01)

(58) Field of Classification Search
CPC .......... H04B 2201/71323; H04B 2201/71376; H04W 72/0446; H04W 72/0453; G06F 2203/0384; G06F 3/03543; G06F 3/038; G06F 3/023; H04L 1/0015; H04L 1/0025; H04L 1/1874

See application file for complete search history.

(56) References Cited

U.S. PATENT DOCUMENTS

| | | | |
|---|---|---|---|
| 7,236,511 | B2 | 6/2007 | Batra et al. |
| 7,664,162 | B1 | 2/2010 | Lavelle et al. |
| 7,724,708 | B2 | 5/2010 | Shiue et al. |
| 7,835,697 | B2 | 11/2010 | Wright |
| 8,204,096 | B2 | 6/2012 | Lin et al. |
| 8,538,340 | B2 | 9/2013 | Sen |
| 8,768,253 | B2 | 7/2014 | Karaoguz et al. |
| 8,892,047 | B2 | 11/2014 | Han et al. |
| 9,374,713 | B2 | 6/2016 | Chan |
| 9,451,630 | B2 | 9/2016 | Chen et al. |
| 9,698,864 | B2 | 7/2017 | Shaffer et al. |
| 9,948,351 | B2 | 4/2018 | Bi et al. |
| 2006/0140251 | A1 | 6/2006 | Brown et al. |
| 2011/0080935 | A1 | 4/2011 | Kim et al. |
| 2011/0103428 | A1 | 5/2011 | Chan |
| 2016/0050552 | A1 | 2/2016 | Kim et al. |
| 2019/0181909 | A1* | 6/2019 | Lee .................. H04B 1/713 |
| 2020/0007187 | A1* | 1/2020 | Seller ................ H04B 1/715 |
| 2020/0059384 | A1 | 2/2020 | Zhang et al. |
| 2020/0163055 | A1 | 5/2020 | Matthews et al. |

FOREIGN PATENT DOCUMENTS

| | | |
|---|---|---|
| CN | 102647266 A | 8/2012 |
| CN | 102882549 A | 1/2013 |
| CN | 103391113 A | 11/2013 |
| CN | 104267837 A | 1/2015 |
| CN | 105309025 A | 2/2016 |
| GB | 2406479 B | 10/2007 |
| KR | 20070048507 A | 5/2007 |
| TW | 201737635 A | 10/2017 |
| WO | 2019020181 A1 | 1/2019 |

OTHER PUBLICATIONS

Acharya, Dinesh. "Performance Measurements of Bluetooth 5 Technique Under Interference," University of Oulu, Degree Programme in Wireless Communications Engineering, Master's Thesis (Nov. 2019), 59 pages.
European Search Report for corresponding EP Application No. 20942364.9 issued Jul. 19, 2023 (9 pages).
International Search Report, PCT/SG2020/050364, dated Mar. 12, 2021.
Chinese Notice of Opinion on the First Examination; dated Sep. 30, 2024; application # 202080101251.2.
Taiwanese First Office Action; dated Sep. 30, 2024; application # 110121297.

* cited by examiner

WIRELESS DATA COMMUNICATION METHOD, COMPUTER PERIPHERAL DEVICE AND RECEIVER DEVICE

TECHNICAL FIELD

An aspect of the disclosure relates to a computer peripheral device. Another aspect of the disclosure relates to a receiver device. Another aspect of the disclosure relates to a wireless data communication method.

BACKGROUND

Data communication via a fixed frequency channel may suffer from interference, for example, when the interfering signal is too strong so that the signal cannot be correctly recovered at a receiver. To avoid interference in a first frequency channel, frequency hopping may be adapted, wherein a neighboring frequency channel is used when the first frequency channel is bad. However, the interference may not be avoided when the interference source is also transmitting in this neighboring channel. Therefore, there is a need for an improved communication method to avoid interferences.

SUMMARY

An aspect of the disclosure relates to a computer peripheral device including computer peripheral function circuitry to provide one or more predefined peripheral functions to a computer. The computer peripheral device may further include a human interface to receive and/or to present data from or to a user. The computer peripheral device may further include an encoder to encode a datastream using the data. The computer peripheral device may further include a communication circuitry configured to implement a wireless data communication with a receiver device to couple to the computer. The communication circuitry may be further configured to transmit the datastream in accordance with a wireless communication protocol. The communication protocol may operate with a first frequency band and a second frequency band, which may be non-overlapping, one being located in a lower frequency range than the other. Each of the first and second frequency bands may be divided into a plurality of sub-bands. Each sub-band of the plurality of sub-bands may be further divided into a plurality of frequency channels. Transmitting the datastream in accordance with the wireless communication protocol may include transmitting data of the datastream via an operation frequency channel during a first time slot and a second time slot. The first time slot and the second time slot may alternate in a periodic sequence. The first time slot and the second time slot may have fixed durations. During the first time slot, the operation frequency channel may be a first operation frequency channel selected according to a first frequency hopping sequence from one frequency channel of the plurality of frequency channels of one sub-band of the plurality of sub-bands of the first frequency band. The first operation frequency channel may be selected as a next first operation frequency channel of the first frequency hopping sequence due to a first error condition becoming satisfied. During the second time slot, the operation frequency channel may be a second operation frequency channel selected according to a second frequency hopping sequence from one frequency channel of the plurality of frequency channels of one sub-band of the plurality of sub-bands of the second frequency band. The second operation frequency channel may be selected as a next second operation frequency channel due to a second error condition becoming satisfied. Any two adjacent frequency channels of the first frequency hopping sequence or any two adjacent frequency channels of the second frequency hopping sequence may be of different sub-bands.

Another aspect of the disclosure relates to a receiver device being coupleable to a computer, and including a communication circuitry configured to implement a wireless data communication with the computer peripheral device according to any of the previous claims.

Another aspect of the disclosure relates to a wireless data communication method, for communication between a computer peripheral device and a receiver device. The wireless data communication method may include transmitting a datastream from a computer peripheral device to a receiver device, in accordance with a wireless communication protocol. The communication protocol may operate with a first frequency band and a second frequency band, which may be non-overlapping, one being located in a lower frequency range than the other. Each of the first and second frequency bands may be divided into a plurality of sub-bands. Each sub-band of the plurality of sub-bands may be further divided into a plurality of frequency channels. Transmitting the datastream in accordance with the wireless communication protocol may include transmitting data of the datastream via an operation frequency channel during a first time slot and a second time slot. The first time slot and the second time slot may alternate in a periodic sequence. The first time slot and the second time slot may have fixed durations. During the first time slot, the operation frequency channel may be a first operation frequency channel selected according to a first frequency hopping sequence from one frequency channel of the plurality of frequency channels of one sub-band of the plurality of sub-bands of the first frequency band. The first operation frequency channel may be selected as a next first operation frequency channel of the first frequency hopping sequence due to a first error condition becoming satisfied. During the second time slot, the operation frequency channel may be a second operation frequency channel selected according to a second frequency hopping sequence from one frequency channel of the plurality of frequency channels of one sub-band of the plurality of sub-bands of the second frequency band. The second operation frequency channel may be selected as a next second operation frequency channel due to a second error condition becoming satisfied. Any two adjacent frequency channels of the first frequency hopping sequence or any two adjacent frequency channels of the second frequency hopping sequence may be of different sub-bands.

In some embodiments, the peripheral device may be a human interface device (HID), for example a computer mouse or a keyboard.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
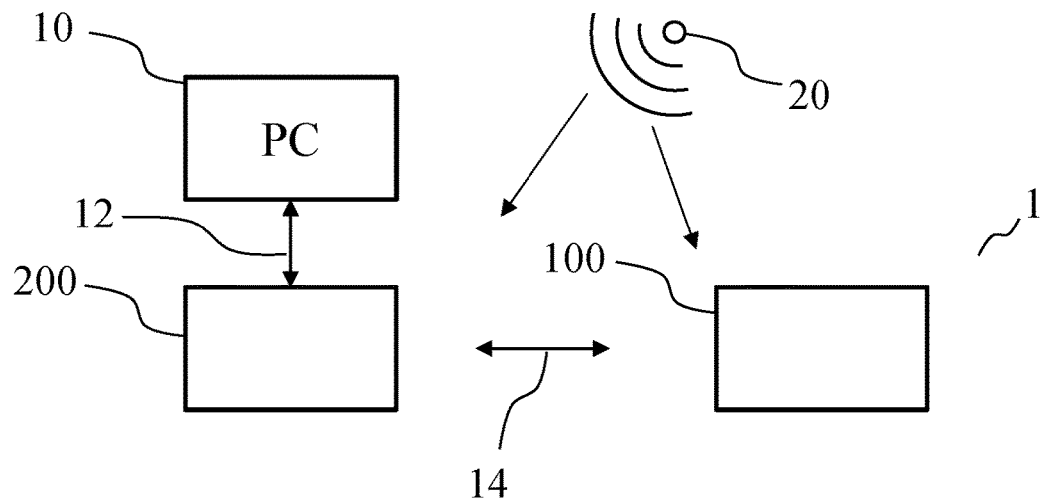
FIG. 1 shows a schematic view of a system 1 in accordance with various embodiments, including a computer peripheral device 100 as peripheral device and a receiver device 200 configured to communicate with each other via an operation frequency channel 14, wherein the receiver device is coupleable to a computer 10.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of a computer peripheral device or a receiver device are analogously valid for the other computer peripheral device or receiver device. Similarly, embodiments described in the context of a wireless data communication method are analogously valid for a computer peripheral device or a receiver device, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, and as used herein, the term "and/or" includes any and all combinations of one or more of the associated listed items.

In the context of various embodiments, and as used herein, the frequencies, frequency channels, frequency bands, and frequency sub-bands may be radio frequency (RF). For example, each of the first frequency band and the first frequency band may be a RF frequency band, for example, within the frequency range of. For example, the first frequency band and the second frequency band may be in the 2.4 GHz frequency spectrum, which spectrum maybe, for example, from 2402 Mhz to 2480 Mhz. For example, the first frequency band may be from 2402 Mhz to 2441 Mhz, and the second frequency band starts from 2442 Mhz to 2480 Mhz (or vice-versa). However, the disclosure is not limited thereto.

In the context of various embodiments, and as used herein, terms like 'first' and 'second' are used to distinguish elements of the disclosure and do not necessarily indicate that the 'first' comes before the 'second'. For example, the term 'first' as in the first transmitter, the first receiver, the first frequency channel selector indicates that they are included in the computer peripheral device, conversely, the receiver device includes a second transmitter, a second receiver, and a second frequency channel selector. Explanations for the first transmitter, the first receiver, and the first frequency channel selector may be applicable to the second transmitter, the second receiver, and the second frequency channel selector respectively. Further, the term 'first' as in first operation frequency channel and first plurality of frequency channels which are associated to the first time slot distinguishes these from the second operation frequency channel and the second plurality of frequency channels which are associated to the second time slot.

Explanations for the computer peripheral device may apply to the receiver device and vice-versa, accordingly references to 'digital device' (without or the 'first' or 'second') may apply to one or each of the computer peripheral device and the receiver device.

It will be understood that a transmitter device may be referred to as a transmitter or as a sender, interchangeably, and that a receiver device may be referred to as a receiver. Analogously, transmitting and sending may be used herein interchangeably.

In an embodiment, a "circuit" (or the plural circuitry) may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In embodiments, a human interface to receive and/or to present data from or to a user may include electronic elements (hardware) such as transducers, for example a mechanical key, an optical sensor, etc.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Figure 2:
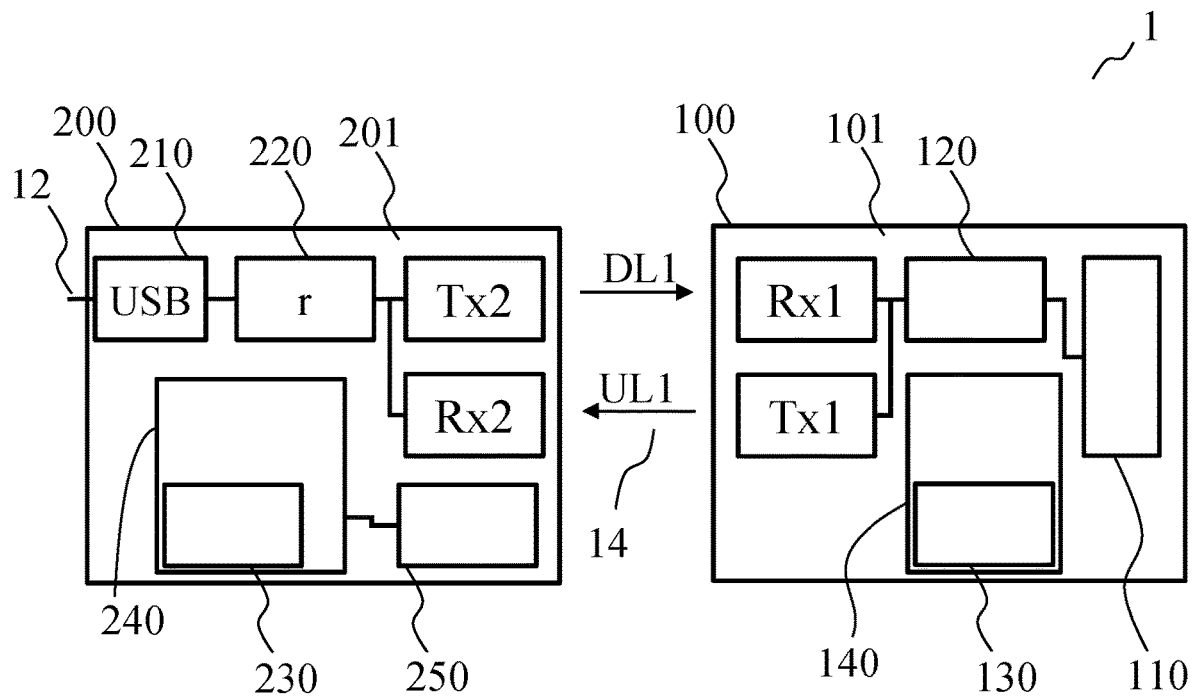
FIG. 2 shows details of the computer peripheral device 100 and of the receiver device 200, in accordance with various embodiments.

Reference will be made to the figures for illustrating various embodiments and inventions, however, the present disclosure is not limited thereto. A computer peripheral device 100 is shown in FIG. 1 and FIG. 2. In FIG. 1, a system is shown in which a computer peripheral device 100 and a receiver device 200 are configured to communicate which each other over an operation frequency channel 14. The computer peripheral device 100 may be a peripheral device, for example a human interface device (HID) such as a computer mouse 101 or a keyboard. The receiver device 200 may be a communication unit included by and/or coupleable to a computer 10, for example a USB dongle 201.

According to various embodiments, the computer peripheral device 100 may include a computer peripheral function circuitry 101 to provide one or more predefined peripheral functions to a computer 10. The computer peripheral device may include a human interface to receive and/or to present data from or to a user. The computer peripheral interface may further include an encoder 110 to encode a datastream using the data. The computer peripheral interface may be a communication circuitry configured to implement a wireless data communication with a receiver device 200 to couple to the computer 10.

In the context of various embodiments, and as used herein, the 'data' may include the meaning of data packet, e.g., when referring to data of the datastream.

For example, the computer peripheral device may include a first transmitter Tx1 configured to send first data UL1 over an operation frequency channel 14 and a first receiver Rx1 configured to receive second data DL1, which may be received over the operation frequency channel 14. According to various embodiments, the computer peripheral device may include a first frequency channel selector 140 configured to select the operation frequency channel 14 as the first operation frequency channel 1CHn, and configured to select the operation frequency channel 14 as the second operation frequency channel 2CHn in accordance to the wireless communication protocol.

The first time slot TS1 and the second time slot TS2 may repeat in a periodic sequence, for example as TS1, TS2, TS1, TS2, . . . . The first plurality of frequency channels 1CH may be included within a first frequency band B1. The second plurality of frequency channels 2CH may be included within a second frequency band B2. According to various embodiments, frequencies of the first frequency band B1 and of the second frequency band B2 do not overlap. According to various embodiments, the first frequency band B1 and the second frequency band B2 do not overlap. The first frequency band B1 may also be called the lower frequency band and the second frequency band B2, being in a frequency range higher than the first frequency band B1, may also be called the higher frequency band. Alternatively, the first frequency band B1 may be also called the higher frequency band and the second frequency band B2, being in a frequency range lower than the first frequency band B1, may also be called the lower frequency band.

According to various embodiments, a frequency channel selector is configured to select the operation frequency channel before data is transmitted and/or received, for example the operation frequency channel may be selected during the time slot before data is send and/or received for the time slot, or may be selected after data is send and/or received in preparation for the next send and/or receive operation, e.g., in preparation for a next time-slot.

According to various embodiments, the first frequency channel selector 140 selects the first operation frequency channel 1CHn based on a first frequency channel hopping sequence S1 (also simply named as first frequency hopping sequence), and is configured accordingly. The first frequency channel selector 140 selects the second operation frequency channel 2CHn based on a second frequency channel hopping sequence S2 (also simply named as second frequency hopping sequence), and is configured accordingly. The first frequency channel selector 140 may include a memory 130. The computer peripheral device 100, for example, the first frequency channel selector 140, may be configured to store the first frequency hopping sequence S1 and/or the second frequency hopping sequence S2 in the memory 130.

According to some embodiments, the computer peripheral device 100 may be configured to generate the first frequency hopping sequence S1 and/or the second frequency hopping sequence S2. According to some embodiments, the computer peripheral device 100 may be configured to update the first frequency hopping sequence S1 and/or the second frequency hopping sequence S2. Alternatively or in addition, the computer peripheral device 100 may be configured to receive the first frequency hopping sequence S1 and/or the second frequency hopping sequence S2, for example, via the first receiver Rx1 for synchronizing the hopping sequences with a receiver device 200. Thus, in some embodiments the computer peripheral device 100 may include a hopping sequence generator, and in other embodiments the computer peripheral device 100 may not necessarily include a hopping sequence generator, since the first frequency hopping sequence S1 and/or the second frequency hopping sequence S2 may be received from the receiver device 200, therefore the computer peripheral device 100 may be simplified.

The system in FIG. 2 shows a computer peripheral device 100 and a receiver device 200. According to various embodiments, the computer peripheral device 100 and the receiver device 200 are configured to communicate with each other in accordance to the communication protocol. For example, the first transmitter Tx1 may be configured to send first data UL1 over an operation frequency channel 14 to a second receiver Rx2 of the receiver device 200 as a datastream. The second transmitter Tx2 may be configured to send second data DL1 over an operation frequency channel 14 to the first receiver Rx1 of the computer peripheral device 100. According to some embodiments, the second data DL1 may be a datastream. According to various embodiments, the receiver device 200, for example, the second frequency channel selector 240, may be configured to store the first frequency hopping sequence S1 and/or the second frequency hopping sequence S2 in the memory 230.

According to various embodiments, for a system 1 including a computer peripheral device 100 and a receiver device 200, at least one of the computer peripheral device 100 and a receiver device 200 includes a hopping sequence generator, for example the receiver device 200 may include a hopping sequence generator 250 and may be configured to send the first frequency hopping sequence S1 and/or the second frequency hopping sequence S2 to the computer peripheral device 100, for example, via a second transmitter Tx2. In embodiments, the other digital device may be hopping sequence generator free, or may include a disabled hopping sequence generator, thus allowing the use of a same circuit for the computer peripheral device 100 and the receiver device 200, wherein the hopping sequence generator may be enabled or disable according to a preferred use. This may simplify production, as the enabling or disabling may be simply set with a corresponding flag.

According to some embodiments, the computer peripheral device 100 may include an encoder 110 to provide or to generate data. When one of the digital devices is configured as an HID, for example the computer peripheral device 100 as illustrated by way of example in FIG. 2, the digital device may include further digital circuits to perform HID functions. For example, the encoder 110 may be a mouse circuit configured to generate data about one or more of mouse movements, button clicks, and scroll wheel.

According to some embodiments, the receiver device 200 may be configured to couple to a computer, for example a computer bus, such as a USB bus. According to some embodiments, the receiver device 200 may include a data interface 210, for example a USB interface. For example, the receiver device may be a USB dongle.

According to some embodiments, the computer peripheral device 100 may include a data buffer 120 configured to store first data UL1 to be sent and/or to store second data DL1 which is received. According to some embodiments, the receiver device 200 may include a data buffer 220 configured to store first data UL1 received and/or to stored second data DL1 to be sent.

According to various embodiments, the computer peripheral device 100 and the receiver device 200 may each further include other circuits usually employed for data communication which will not be further explained in detail for simplicity, for example, each may independently include one or more of: internal clock, clock synchronization circuit, clock recovery circuit, microcontroller, encryption circuit, decryption circuit, memory, microcontroller, amplifier, antenna, a combination of any of the foregoing.

In the following, it will be explained how frequency channel hopping is decided and performed using FIG. 3 for illustration purposes. As with the other figures, the present disclosure is not limited thereto. References are made to the computer peripheral device 100 for ease of understanding, however the receiver device 200 may be configured in the same way. The skilled person will understand that, for a system, each of the computer peripheral device 100 and the receiver device 200 will have synchronized frequency hopping sequences, and synchronized operation frequency channel so that communication is not lost.

Figure 3:
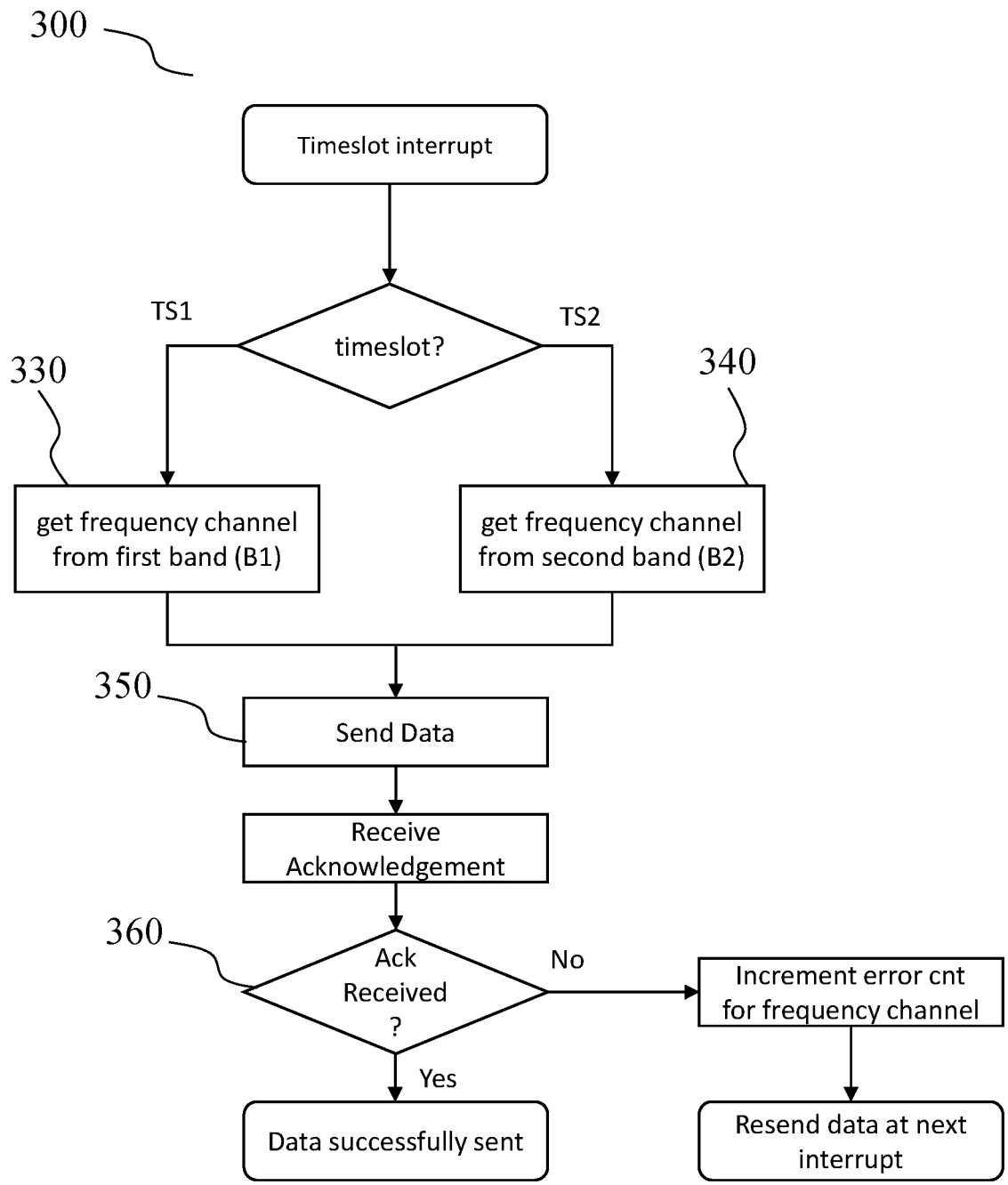
FIG. 3 shows an exemplary wireless data communication method 300 in accordance with various embodiments.

According to various embodiments, a wireless data communication method 300 is envisaged, for example as shown in FIG. 3. The wireless data communication method 300 may include transmitting a datastream 350 from a first digital device 100 to a receiver device 200, in accordance with the wireless communication protocol. The communication protocol operates with a first frequency band B1 and a second frequency band B2, which may be non-overlapping, one being located in a lower frequency range than the other. Each of the first and second frequency bands B1, B2 may be divided into a plurality of sub-bands. Each sub-band of the plurality of sub-bands may be further divided into a plurality of frequency channels.

The wireless data communication method 300 may include providing data of the data stream to be transmitted, for example, first data. The wireless data communication method 300 may include determining whether the first time slot TS1 or the second time slot TS2 is currently available. For example, by comparing the time of an internal clock of the digital device, for example odd milliseconds may be assigned to the first time slot TS1 and even milliseconds may be assigned to the second time slot TS2. Alternatively or in addition, time checks are performed at regular intervals, for example via a timer interrupt named in FIG. 3 as Timeslot Interrupt, and it is only checked whether a last time slot or the last x time slots (x being an integer equal or greater than 2) were TS1 in which case the current time slot will be TS2 or a last time slot or the last x time slots were TS2 in which case the current time slot will be TS1, however other implementations are possible. Determination of the current timeslot may be made in a determination block, for example as illustrated in FIG. 3 by "timeslot?". The wireless data communication method 300 may include providing transmitting data of the datastream 350 by the computer peripheral device 100 to a receiver device 200 over an operation frequency channel during a first time slot TS1 and during a second time slot TS2 which repeat in periodic sequence, for example alternately.

Transmitting the datastream in accordance with the wireless communication protocol may include transmitting data of the datastream via an operation frequency channel during a first time slot TS1 and a second time slot TS2. The first time slot TS1 and the second time slot TS2 may have fixed durations and may alternate in a periodic sequence.

During the first time slot TS1, the operation frequency channel may be a first operation frequency channel 1CHn selected according to a first frequency hopping sequence from one frequency channel of the plurality of frequency channels of one sub-band of the plurality of sub-bands 1SB of the first frequency band B1. During the second time slot TS2, the operation frequency channel may be a second operation frequency channel 2CHn selected according to a second frequency hopping sequence S2 from one frequency channel of the plurality of frequency channels of one sub-band of the plurality of sub-bands 2SB of the second frequency band B2.

According to various embodiments, the method may include a step of obtaining 330 the operation frequency channel as the first operation frequency channel 1CHn. According to various embodiments, the method may include a step of obtaining 340 the operation frequency channel as the second operation frequency channel 2CHn.

The first operation frequency channel 1CHn may be selected as a next first operation frequency channel 1CHnp1 of the first frequency hopping sequence S1 due to a first error condition becoming satisfied. The first operation frequency channel 1CHn may, when the first error condition does not become satisfied, remain as the current first operation channel, meaning that no hopping takes place for the first operation frequency channel and the same channel of the first frequency hopping sequence S1 remains in use for the first time slot TS1. According to various embodiments, the wireless data communication method may include a step of changing 334 the first operation frequency channel 1CHn to a next first operation frequency channel 1CHnp1 for the first time slot TS1 based on a first frequency hopping sequence S1 including the first plurality of frequency channels 1CH for the first time slot TS1.

According to various embodiments the first frequency channel selector 140 may be configured to carry out a first frequency channel hopping in which a next first operation frequency channel 1CHnp1 is selected based on the first frequency hopping sequence S1, when the first error condition becomes satisfied for the first time slot TS1. The first frequency channel selector 140 may be configured to keep the first operation frequency channel 1CHn unchanged when the determination succeeds to confirm the receipt of the first data UL1 for the first time slot TS1, e.g., the confirmation ACK1 is received.

The second operation frequency channel 2CH may be selected as a next second operation frequency channel 2CHnp1 due to a second error condition becoming satisfied. The second operation frequency channel 2CHn may, when the second error condition does not become satisfied, remain as the current second operation channel, meaning that no hopping takes place for the second operation frequency channel and the same channel of the second frequency hopping sequence S2 remains in use for the second time slot TS2. According to various embodiments, the wireless data communication method may include a step of changing the second operation frequency channel 2CHn to a next second operation frequency channel 2CHnp1 for the second time slot TS2 based on a second frequency hopping sequence S2 including the second plurality of frequency channels 2CH for the second time slot TS2.

According to various embodiments the first frequency channel selector 140 may be configured to carry out a second frequency channel hopping in which a next second operation frequency channel 2CHnp1 is selected based on the second frequency hopping sequence S2, when the second error condition becomes satisfied for the second time slot TS2. The first frequency channel selector 140 may be configured to keep the second operation frequency channel 2CHn unchanged when the determination succeeds to confirm the receipt of the first data UL1, e.g., the confirmation ACK1 is received.

According to various embodiments, the first and second frequency hopping sequences may be configured and/or generated such that any two adjacent frequency channels of the first frequency hopping sequence S1 or any two adjacent frequency channels of the second frequency hopping sequence S2 are of different sub-bands.

As previously explained, frequencies of the first frequency band B1 and of the second frequency band B2 do not overlap. Since the first time slot TS1 is associated with the first frequency band B1 and the second time slot TS2 is associated with the second frequency band B2, the first time slot may also be named low frequency time slot and the second time slot may also be named high frequency time slot, or vice-versa, depending on which one of the bands has higher frequency.

According to various embodiments, the first error condition becomes satisfied when the determination fails to confirm the receipt of the first data UL1 for the first operation frequency channel 1CHn, and a count of determination failures for said frequency channel exceeds a first predetermined threshold.

According to various embodiments, the second error condition becomes satisfied when the determination fails to confirm the receipt of the first data UL1 for the second operation frequency channel 2CHn, and a count of determination failures for said frequency channel exceeds a second pre-determined threshold.

According to various embodiments, the computer peripheral device 100 may further include a comparator configured to carry out a determination whether the second data DL1 may include a confirmation ACK1, ACK2 of receipt of the first data UL1 by the receiver device 200 for the respective time slot.

According to various embodiments, the wireless data communication method may include a step of sending the data of the datastream 350, for example sending the first data in case of the computer peripheral device 100 or sending the second data in case of the receiver device 200. The wireless data communication method may include waiting for the second data DL1 to be a confirmation ACK1 of the receipt of the first data UL1 by the receiver device 200, a non-receipt of confirmation being a failed transmission. The wireless data communication method may further include determining 332 that a count of failed transmissions CNT1 has exceeded a threshold EMAX1 for the operation frequency channel. For example, the threshold may be 1, and when CNT1 is 2, that means that the threshold EMAX1 having been exceeded has been determined. In other examples, the threshold may be zero, thus it may be exceeded by an error count of 1. FIG. 3 shows one possible implementation of the determining 332 as illustration, and the disclosure is not limited thereto. In FIG. 3 an acknowledgment is waited for, in a step shown as receive acknowledgement. In case the acknowledgment is received (as determined for example, in a step 360) the data transmission is successful and may continue with a next data, e.g., if any next data is available. In case the acknowledgment is not received the data will be re-sent, for example at the next interrupt, and a failed transmission is stored and/or a counter of failed transmissions is incremented for the current frequency channel.

According to various embodiments, a wireless data communication method may include transmitting a synchronization packet. The synchronization packet may be in a pre-determined sync data-format and may be sent when there is no other data to be sent, e.g., no HID data. The synchronization packet may be sent from the computer peripheral device 100 to the receiver device 200. Alternatively or in addition, the synchronization packet may also be sent from the receiver device 200 to the computer peripheral device 100. According to various embodiments, the synchronization packet may be included in the data stream.

According to various embodiments, the receiver device 200 and/or the computer peripheral device 100 may be configured to detect loss of communication when no data is received for a connection timeout interval. When the connection timeout interval is exceeded, the computer peripheral device 100 and the receiver device 200 transition to reconnection mode to establish the connection again.

According to various embodiments, data of the datastream may have, or be formatted into, a specific data format. The data format may include a parameter indicating a number count of determination failures for the specific frequency channel in use. According to various embodiments, the parameter may be included in a head field of the data packet.

Figure 4:
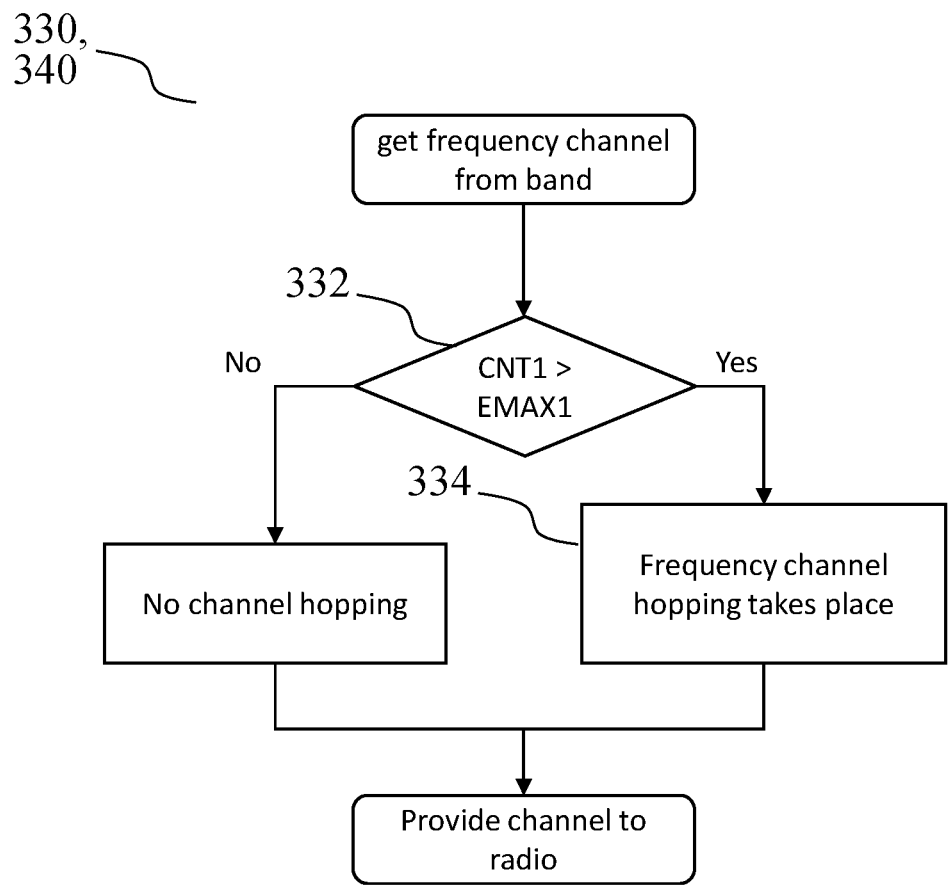
FIG. 4 shows details about how the respective operation frequency channel may be selected within a frequency band as it may be implemented in step 330 and/or step 340, in accordance with various embodiments.

A non-limiting example of a step of obtaining 330, 340 (i.e. selecting) a next operation frequency channel as the operation frequency channel is shown in more details in FIG. 4. The method may be identical or similar for the first time slot TS1 and the second time slot TS2, by using the corresponding frequency hopping sequence. A comparison 332 is made whether the count of failed transmissions CNT1 for the current frequency channel (e.g. 1CH1), is greater than the threshold EMAX1. According to various embodiments, the threshold EMAX1 is a pre-determined value selected from an integer equal or greater than 0, for example equal or greater than 1, and is synchronized (i.e. identical) between the computer peripheral device 100 and the receiver device 200 of the system, to allow for simultaneous frequency channel hopping at both devices so that communication remains. In the case that comparison 332 is negative (e.g., CNT1>EMAX1 is False), the error condition is not satisfied and there is no frequency channel hopping and the frequency channel remains the same as last used for the respective timeslot, for example the frequency channel. In the case that comparison 332 is positive (e.g., CNT1>EMAX1 is True), the error condition is satisfied and a frequency channel hopping is provided, for example as shown in FIG. 4, a changing 334 of the current operation frequency channel into a next operation frequency channel takes place for the current timeslot, and this next operation frequency channel remains the operation frequency for the timeslot, until another hopping takes place. According to various embodiments, if the current time slot is the first timeslot, then the first operation frequency channel 1CHn may be changed to a next first operation frequency channel 1CHnp1 for the first time slot TS1 based on a first frequency hopping sequence S1 including the first plurality of frequency channels 1CH for the first time slot TS1. Conversely, if the current time slot is the second timeslot TS2, then the second operation frequency channel 2CHn may be changed to a next second operation frequency channel 2CHnp1 for the second time slot TS2 based on a second frequency hopping sequence S2 including the second plurality of frequency channels 2CH for the second time slot TS2.

After changing 334 of the current operation frequency channel into a next operation frequency channel takes place for the current timeslot, for example by selecting the next operation frequency channel out of a frequency hopping sequence, the radio of the digital device may be set accordingly to work with the next operation frequency channel, which then becomes the operation frequency channel. Turning back to FIG. 3, data of the datastream may be sent in step 350 and acknowledgement may be received, or at least awaited, on the selected next operating frequency channel.

According to various embodiments, the receiver Rx1 or Rx2 listens for data, does not receive anything, a frequency channel hopping is carried out, then the corresponding receiver listens for x number of TS1 (or TS2), another frequency channel hopping is carried out if no data is received. The cycle repeats until a connection timeout interval is received during which the corresponding receiver does not receive any data. When the connection timeout interval is exceeded, the computer peripheral device 100 and the receiver device 200 transition to reconnection mode to establish the connection again.

While several embodiments show the comparison whether the count of failed transmissions CNT1 is greater than the threshold EMAX1, other implementations for determining whether one of the error conditions has become satisfied are also possible. For example, the comparison could be whether the count of failed transmissions CNT1 is greater or equal than the threshold EMAX1, in which case the threshold may be selected from an integer equal or greater than 1.

Figure 5:
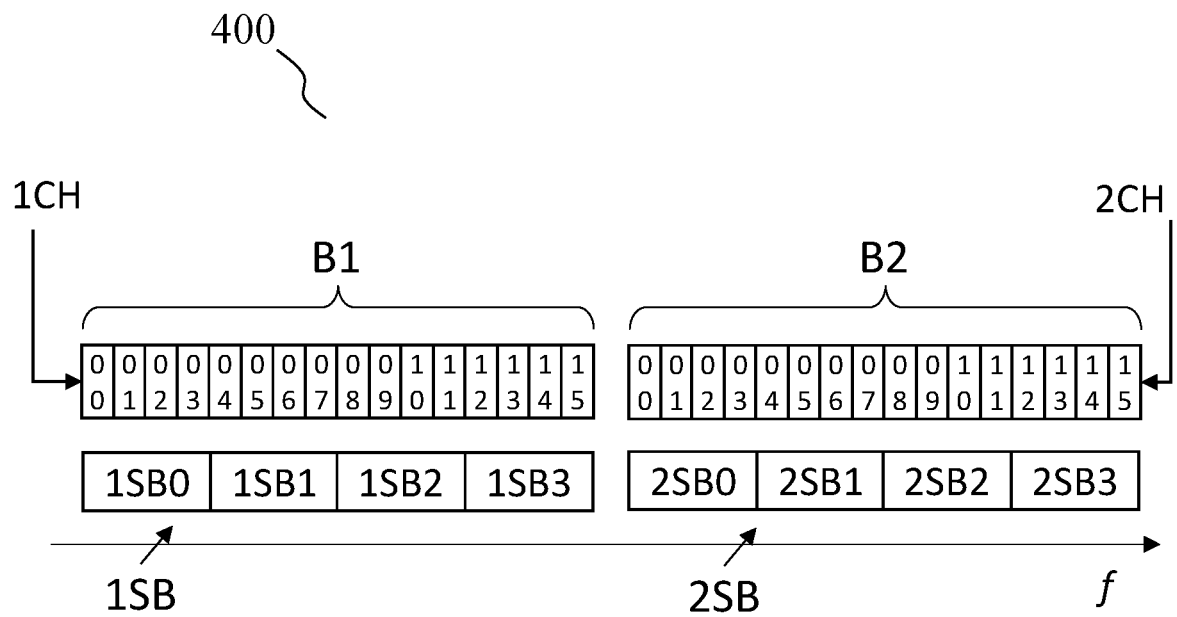
FIG. 5 shows a schematic representation of the frequency bands B1 and B2, their first frequency channels 1CH and second frequency channels 2CH, respectively, which may be optionally further grouped into sub-bands, such as first sub-bands 1SB and second sub-bands 2SB.

An exemplary frequency spectrum 400 is shown in FIG. 5 wherein the horizontal axis indicates that frequency increases to the right for illustration purposes. The first frequency band B1 and the second frequency band B2 do not overlap, and are shown spaced from each other. Alternatively, the first frequency band B1 and the second frequency band B2 may be adjacent to each other. Each of the first and second frequency bands B1, B2 may be divided into a plurality of sub-bands. Therefore, the first plurality of frequency channels 1CH is included within the first frequency band B1 and the second plurality of frequency channels 2CH is included within the second frequency band B2. Each of the frequency bands may be subdivided into frequency channels, for example the first frequency band B1 may be subdivided into the first plurality of frequency channels 1CH, wherein a frequency channel of the first plurality of frequency channels 1CH is denoted as 1CHn, and frequency channels may be identified by the index n being an integer of value zero or greater, for example 1CH00, 1CH01, 1CH02, . . . For example, the second frequency band B2 may be subdivided into the second plurality of frequency channels 2CH, wherein a frequency channel of the second plurality of frequency channels 2CH is denoted as 2CHn, and frequency channels may be identified by the index n being an integer of value zero or greater, for example 2CH00, 2CH01, 2CH02, . . . .

According to various embodiments, the frequency channels within a band may be equally spaced, for example at each 5 Megahertz or at 2 Megahertz, thereby it may be easy to index the frequency channels. For example, the first plurality of frequency channels 1CH may be indexed (n) as 00, 01, . . . 15, and the second plurality of frequency channels 2CH may be indexed (n) as 00, 01, . . . 15, as illustrated in FIG. 5, however the disclosure is not limited thereto, for example there may be more than 16 frequency channels or less than 16 frequency channels.

According to various embodiments, the first frequency band B1 may include first sub-bands 1SB. Each sub-band (1SB0, 1SB1, . . . ) of the first sub-bands 1SB may include two or more frequency channels of the first plurality of frequency channels 1CH. In some embodiments, the first plurality of frequency channels 1CH may include a number of frequency channels which is a multiple of the number of sub-bands 1SB. For example, the multiple may be selected from 2 to 8, such as from 2 to 4, times the sub-bands 1SB. In the illustrated example in FIG. 5, the first plurality of frequency channels 1CH is evenly subdivided into the sub-bands 1SB, and the first frequency band B1 includes 4 first sub-bands 1SB0, 1SB1, 1SB2, and 1SB3, each of the sub-bands including 4 frequency channels. For example, sub-band 1SB0 includes frequency channels 1CH00, 1CH01, 1CH02, and 1CH03.

According to various embodiments, the second frequency band B2 may include second sub-bands 2SB. Each sub-band (2SB0, 2SB1, . . . ) of the second sub-bands 2SB may include two or more frequency channels of the second plurality of frequency channels 2CH. In some embodiments, the second plurality of frequency channels 2CH may include a number of frequency channels which is a multiple of the number of sub-bands 2SB. For example, the multiple may be selected from 2 to 8, such as from 2 to 4, times the sub-bands 2SB. In the illustrated example in FIG. 5, the second plurality of frequency channels 2CH is evenly subdivided into the sub-bands 2SB, and the second frequency band B2 includes 4 second sub-bands 2SB0, 2SB1, 2SB2, and 2SB3, each of the sub-bands including 4 frequency channels. For example, sub-band 2SB0 includes frequency channels 2CH00, 2CH01, 2CH02, and 2CH03.

Figure 6:
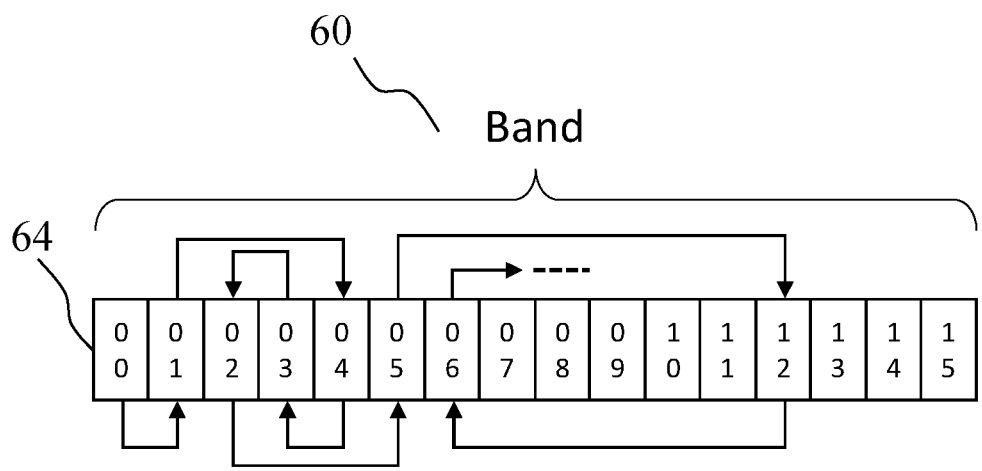
FIG. 6 illustrates a frequency hopping sequence within a frequency band, as a comparative example.

FIG. 6 shows a frequency hopping sequence according to a comparative example, for one of the first frequency band B1 and of the second frequency band B2. In FIG. 6 hopping is shown only for times corresponding to one of the first time slot TS1 or the second time slot TS2. As shown, the frequency hopping sequence is S[0:15]=00, 01, 04, 03, 02, 05, 12, 06, . . . . Data UL1 is sent over the operation frequency channel 14, which is the frequency channel with index 00. The operation frequency channel 14, remains the frequency channel with index 00 until a frequency channel hopping has occurred. As previously explained, only one-time slot is illustrated for ease of explanation.

Once it is determined 332, for example, every time it is determined, that a count of failed transmissions has exceeded a threshold for the operation frequency channel a changing 334 is carried out to change the operation frequency channel to a next operation frequency channel, which according to the exemplary sequence S[0:15] is frequency channel 01. The frequency hopping sequence need not be in a sequential increased or decreased frequency of the frequency channels, for example a hopping from frequency channel 12 in exemplary frequency hopping sequence S[0:15] results in frequency channel 06. Above example shows hopping within one of the first plurality of frequency channels 1CH or the second plurality of frequency channels 2CH according to some embodiments. In other embodiments, hopping may further consider the sub-bands. The frequency hopping sequences for both time slots may be independently generated, for example, according to a frequency scan, in which the frequency channels are sorted, for example from highest to lowest signal to noise ratio or received signal strength indicator (rssi).

According to some embodiments, when the frequency hopping sequence is exhausted, i.e., each of the plurality of frequency channels have been selected and eventually resulted in failed transmission, the frequency hopping sequence can re-start from the beginning, e.g., wherein all error counts for each frequency channel is re-set, meaning set into a pre-determined initial state, e.g., to zero. Alternatively, a re-generation of the frequency hopping sequence may be carried out. In this comparative example of FIG. 6, sub-band hopping is not employed. When a source of interference has a large frequency band, overlapping more than one neighboring channel, communication within the time slot can be severely disrupted until hopping arrives at a viable channel.

Frequency channel hopping among different sub-bands will be explained in the following.

According to various embodiments the first frequency band B1 may include first sub-bands, and wherein each sub-band of the first sub-bands may include two or more frequency channels of the first plurality of frequency channels 1CH. According to various embodiments the second frequency band B2 may include second sub-bands, and wherein each sub-band of the second sub-bands may include two or more frequency channels of the second plurality of frequency channels 2CH.

According to various embodiments the next first operation frequency channel 1CHnp1 may be selected out of a selected sub-band different from the sub-band of the first operation frequency channel 1CHn. According to various embodiments the next second operation frequency channel 2CHnp1 may be selected out of a sub-band different from the sub-band of the second operation frequency channel 2CHn.

The frequency channels in the frequency hopping sequence may be selected such that all sub-bands are addressed, each using a single frequency channel, before any of the sub-bands is repeated. In examples, only one frequency channel of the two or more frequency channels of each sub-band may be available in the frequency hopping sequence until all sub-bands have been used, and before any sub-band is used again. According to various embodiments, any neighboring frequency channels of a frequency hopping sequence (e.g., the first frequency hopping sequence S1 or the second frequency hopping sequence S2) are of different sub-bands such that each frequency channel hopping is also a sub-band hopping. In one example the frequency hopping sequence (e.g., S1 or S2) may be a frequency channel from sub-band 1 (e.g. 1SB0), a frequency channel from sub-band 2 (e.g. 1SB1), a frequency from sub-band 3 (e.g. 1SB2), a frequency from sub-band 4 (e.g. 1SB3) and repeating the sub-bands but with different frequency channels. It is understood that the frequency hopping sequence is independent for the first time slot and the second time slot. While 4 sub-bands are described as an example, the disclosure is not limited thereto. The frequency hopping sequence may be stored as such in a memory. In another example the frequency channel list including each of the plurality of frequency channels, e.g., sorted and in sequence, may be stored in the memory and a hopping algorithm selects a next frequency channel from another sub-band, thus, dynamically generating the frequency hopping sequence. In an example, the sub-band information may also be stored in a memory, or may be calculated.

According to various embodiments, the first frequency hopping sequence may be provided, e.g., generated, such that two, e.g., any two, neighboring frequency channels of the first frequency hopping sequence are of different sub-bands such that each frequency channel hopping is also a sub-band hopping. According to various embodiments, the second frequency hopping sequence may be provided, e.g., generated, such that two, e.g., any two, neighboring frequency channels of the second frequency hopping sequence are of different sub-bands such that each frequency channel hopping is also a sub-band hopping.

Figure 7:
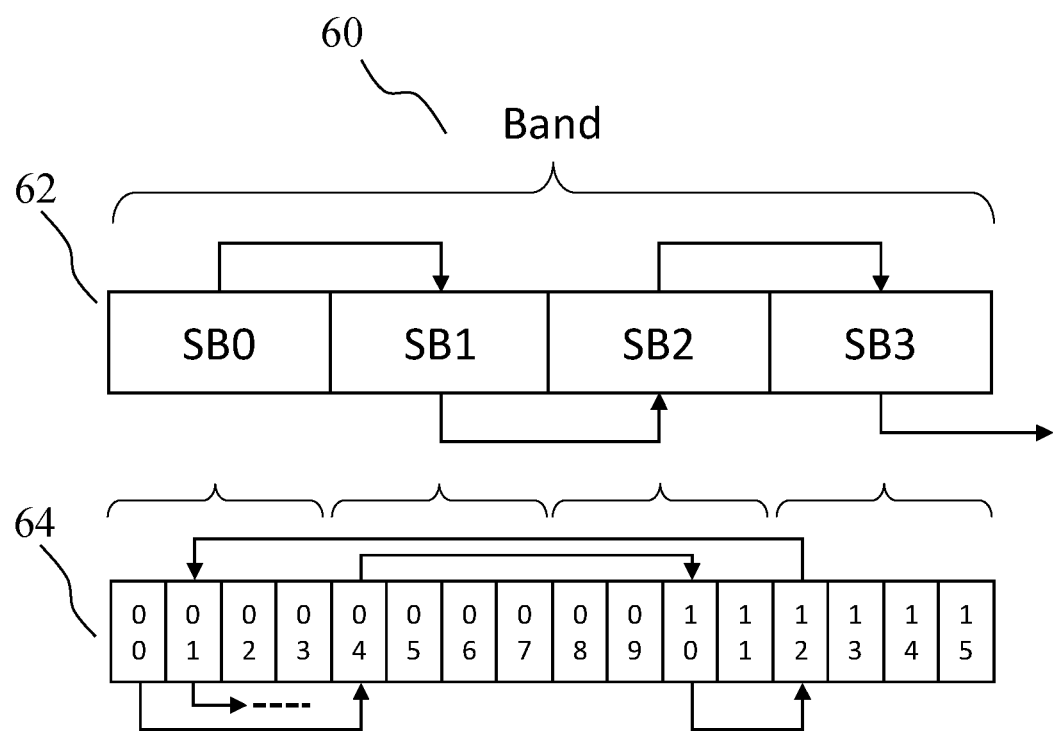
FIG. 7 illustrates a frequency hopping sequence within a frequency band utilizing sub-bands, in accordance with various embodiments.

FIG. 7 illustrates a frequency hopping sequence within a frequency band utilizing sub-bands, in accordance with various embodiments. For simplicity, only one frequency band 60 is shown to demonstrate the frequency channel hopping for one time slot of the first time slot TS1 or the second time slot TS2, while the other time slot may be implemented identically, for its corresponding frequency band. The frequency hopping sequence is independent for the first time slot and the second time slot. The blocks 62 represent the sub-bands SB0, SB1, SB2, and SB3. The frequency hopping sequence is such that, when starting from sub-band SB0 the next frequency channel is in sub-band SB1, then in SB2, and so on, until the last sub-band, which in this example is SB3, is selected, only then may sub-band SB0 be selected again, however with a different frequency channel than previously used for that sub-band. With such a sub-band hopping, the operation frequency channel, for example, the first operation frequency channel or the second operation frequency channel is, when hopping becomes necessary, selected from a different sub-band.

The blocks 64 of FIG. 7 show an example of the frequency channels actually selected as operation frequency channel. The exemplary frequency hopping sequence is S[0:15]=00, 04, 10, 12, 01, . . . Starting from frequency channel 00, once hopping is necessary when the error condition becomes satisfied (e.g., due to the error count for that frequency channel having exceeded the threshold), the next frequency channel selected as the operation frequency channel is 04, which is from the second sub-band SB1. The next hop is to frequency channel 10 of sub-band SB2, then frequency channel 12 of sub-band SB3, followed by a hop to another frequency channel of sub-band SB0, such as frequency channel 01, since frequency channel 00 has been marked as 'not-usable'.

According to some embodiments, when at least one of the sub-frequency channels has no frequency channel left to hop to, e.g., no frequency channel left for which no error condition has become satisfied, the frequency hopping sequence can restart from the beginning, e.g., wherein all error counts for each frequency channel are re-set, e.g., to zero, and/or all error conditions being cleared. Alternatively, a re-generation of the frequency hopping sequence may be carried out. Alternatively or in addition, the frequency hopping sequence may be continuously updated, for example, the frequency channel(s) may be tested when the radio is idle, for example, the reception is completed or there is no transmission in a timeslot. In some embodiments, the frequency channel(s) being tested may be within a different sub-band of the operating frequency channel for the respective time slot, for example, if a current active sub-band is SB0, only frequency channel(s) which are not in SB0 are tested so that it will have minimum impact to the frequency hopping when the frequency hopping sequence is updated. For example, the frequency channel(s) to be tested may be in a sub-band that is furthest distanced from the sub-band of the operating frequency channel for the respective time slot, e.g. the operating frequency may be in sub-band SB0 and the frequency channel(s) to be tested may be in SB3 (assuming 4 sub-bands are used). In some embodiments, it is envisaged to test all the channels in each sub-band, and update the best channel to each sub-band. Alternatively or in addition, testing may include all frequency channels in the furthest sub-band only, and update the hopping sequence for that sub-band only. According to some embodiments, only one frequency channel may be tested in one timeslot, and multiple tests may be taken for one frequency channel. In one example, assuming that there are 32 frequency channels in total, 4 tests are taken for each frequency channel, and it could take 128 ms (32×4) to complete the test for all channels. While several embodiments are exemplified, the disclosure is not limited thereto.

According to various embodiments, there may be various conditions for which the frequency hopping sequence may be re-started, re-generated, or updated. The digital device and/or the system may be configured accordingly. For example, the condition may be satisfied when at least one of the first frequency hopping sequence S1 and the second frequency hopping sequence S2 are used up, e.g., a last position is used and hopping is required, such as a bad frequency channel S[15] in S[0:15]. For example, the condition may be given a sub-band is used up, or all sub-bans are used up. Used-up herein means that it has been determined that the error condition has been satisfied for all frequency channels of the sub-band.

While above examples of sub-band hopping were explained using a single frequency band as illustration, the skilled person in the art will appreciate that this simplified explanation applies to each of the first frequency band B1 and the second frequency band B2. According to various embodiments the first time slot TS1 and the second time slot TS2 alternate. According to some embodiments a next first operation frequency channel 1CHnp1 may be selected out of a sub-band different from the sub-band of the first operation frequency channel 1CHn. According to some embodiments a next second operation frequency channel 2CHnp1 may be selected out of a sub-band different from the sub-band of the second operation frequency channel 2CHn.

According to various embodiments each of the first time slot TS1 and the second time slot TS2 may have a fixed duration, e.g., selected from 10 microseconds to 10 milliseconds. For example, the first time slot may have a duration of 500 microseconds and the second time slot may have a duration of 500 microseconds. For example, one cycle of the repetition completes every 1 millisecond.

According to various embodiments determining 332 that a count of failed transmissions CNT1 has exceeded a threshold EMAX1 for the operation frequency channel may be carried out concurrently by the computer peripheral device 100 and by the receiver device 200. Each of the computer peripheral device 100 and the receiver device 200 may have synchronizable, and therefore may have synchronized, first and second frequency hopping sequences. This allows for the receiver of each device to be tuned to the operation frequency channel of the transmitter of the other device, therefore ensuing continuous communication, despite the frequency channel hopping.

According to various embodiments, changing 334 the first operation frequency channel 1CHn, and changing 334 the second operation frequency channel 2CHn may be carried out by a first frequency channel selector 140 included by the computer peripheral device 100, and concurrently, by a second frequency channel selector 240 included by the receiver device 200.

Figure 8:
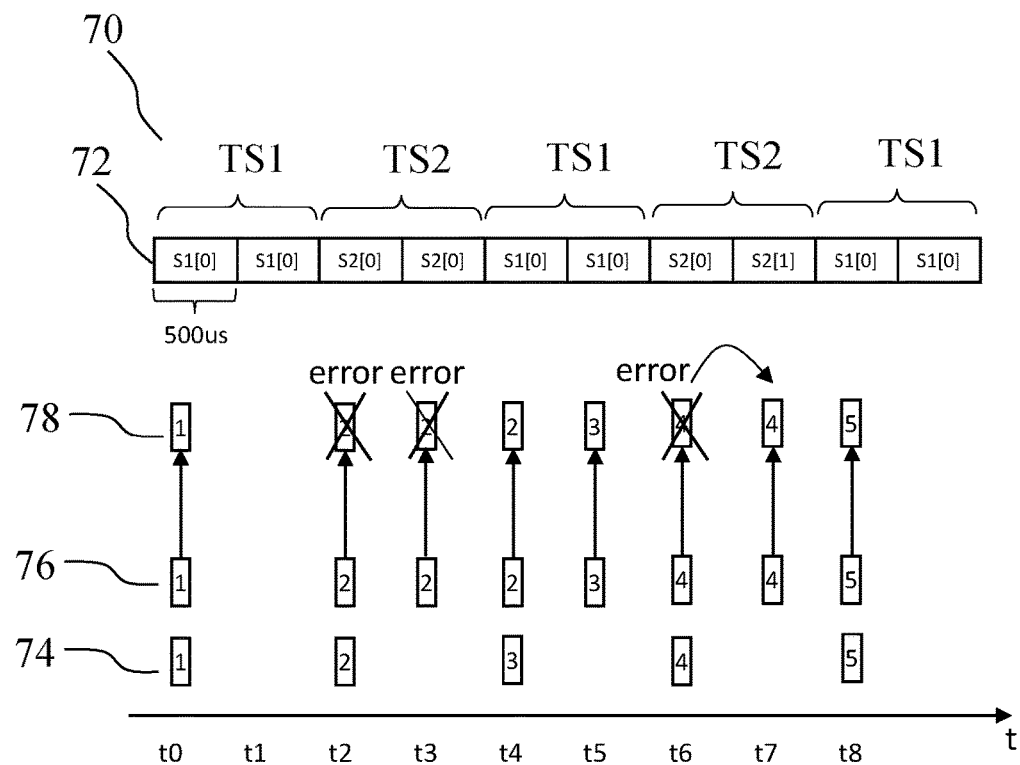
FIG. 8 shows a time diagram for illustrating data transmission with hopping, in accordance with various embodiments.

FIG. 8 shows a time diagram 70 for illustrating data transmission with hopping, in accordance with various embodiments. The time diagram shows both time slots TS1 and TS2 for first data UL1 transmitted from the computer peripheral device 100 to the receiver device 200, the upper blocks 72 represent the timeslots and the corresponding first frequency hopping sequence S1 and second frequency hopping sequence S2. For illustration purposes, each time slot has a duration of 1 millisecond, and each first data is transmitted in form of a data packed with a duration (length) of 500 microseconds.

Further in FIG. 8, a time axis t represents time from t0 to t8. Data 74 available for sending, which is sent 76 as first data UL1 and received 78 by the receiver device 200. The illustrated sequence of events will be explained in the following. As exemplary initial conditions, the operation frequency channel for the first time slot TS1 and the first frequency hopping sequence S1 starts at S1[0] and the operation frequency channel for the second time slot TS2 and the second frequency hopping sequence S2 starts at S2[0]. At time t0, data 1 is available for sending, data 1 may be, e.g., newly provided and/or generated, HID data. The first transmitter Tx1 of the computer peripheral device 100 sends the data 1 as first data UL1 to the receiver device 200 over the operation frequency channel. Since at time t0, the first time slot is active, the first operation frequency channel is selected based on the first frequency hopping sequence S1 according to S1[0]. Data 1 is received by the receiver device 200 which in turn transmits a confirmation ACK1 to the first receiver Rx1 of the computer peripheral device 100, e.g., over the operation frequency channel according to S1[0]. Since no transmission failure has occurred, no error condition becomes satisfied, no hopping of frequency takes place, and the operation frequency channel remains unchanged.

At time t1 no new data is available for sending, and therefore no transmission of data of the datastream takes place. At time t2 data 2 becomes available for sending. The first transmitter Tx1 of the computer peripheral device 100 sends the data 2 as first data UL1 to the receiver device 200 over the operation frequency channel. Since at time t2, the second time slot is active, the first operation frequency channel is selected based on the second frequency hopping sequence S2 according to S2[0], and data 2 is sent. No confirmation ACK1 from the receiver device 200 is received at the first receiver Rx1 of the computer peripheral device 100, which indicates that data 2 is not successfully sent and a transmission failure, indicated in FIG. 8 as 'error', has occurred. An error count CNT2 is increased (e.g., incremented from 0 to 1) for the frequency channel according to S2[0]. At time t3, which is also in the same time slot TS2, data 2 is sent again, and again an error occurs, and error count CNT2 is increased once more (e.g., incremented from 1 to 2).

At time t4 data 3 becomes available, however, since data 2 is not yet successfully send (e.g., is still in the buffer), data 2 is sent first. The first transmitter Tx1 of the computer peripheral device 100 sends the data 2 to the receiver device 200 over the operation frequency channel. Since at time t4, the first time slot TS1 is active, the first operation frequency channel is selected based on the first frequency hopping sequence S1 according to S1[0]. Data 2 is received by the receiver device 200 which in turn transmits a confirmation ACK1 to the first receiver Rx1 of the computer peripheral device 100, e.g., over the operation frequency channel according to S1[0]. Since no transmission failure has occurred, no error condition becomes satisfied, no hopping of frequency takes place, and the operation frequency channel remains unchanged.

At time t5, no new data is made available, however data 3 is still not send, e.g., is still in the buffer. The first transmitter Tx1 of the computer peripheral device 100 sends the data 3 to the receiver device 200 over the operation frequency channel. Since at time t5, the first time slot TS1 is active, the first operation frequency channel is selected based on the first frequency hopping sequence S1 according to S1[0], i.e., in this example of FIG. 8, the operation frequency channel for the first time slot TS1 remains unchanged.

At time t6, data 4 becomes available, which is sent via frequency channel corresponding to S2[0], and again a failure to transmit occurs, and the error count CNT2 for the frequency channel corresponding to S2[0] is increased once more (e.g., incremented from 2 to 3).

It is determined, e.g. at time t7, that the threshold EMAX2 for the operation frequency channel according to S2[0] which is 2 has been exceeded by CNT2 which is 3, and the second error condition becomes satisfied (for channel S2[0]). Thus, the frequency channel for the second time slot TS2 is changed from S2[0] to S2[1], which is still in the same frequency band as S2[1], however in a different sub-band as S2[0]. At time t7, no new data is made available, however data 4 is still not send, e.g., is still in the buffer. The first transmitter Tx1 of the computer peripheral device 100 sends the data 4 to the receiver device 200 over the operation frequency channel. Since at time t7, the second time slot TS2 is active, the second operation frequency channel is selected based on the second frequency hopping sequence S2 according to S2[1]. Data 4 is received by the receiver device 200 which in turn transmits a confirmation ACK1 to the first receiver Rx1 of the computer peripheral device 100, e.g., over the operation frequency channel according to S2[1]. Since no transmission failure has occurred, no hopping of frequency takes place, and the operation frequency channel remains unchanged.

At time t8, new data 5 is made available. The first transmitter Tx1 of the computer peripheral device 100 sends the data 5 to the receiver device 200 over the operation frequency channel. Since at time t8, the first time slot TS1 is active, the first operation frequency channel is selected based on the first frequency hopping sequence S1 according to S1[0], i.e., in this example of FIG. 8, the operation frequency channel for the first time slot TS1 remains unchanged.

In summary, it can be seen in FIG. 8, that, for the first time slot TS1, the operation frequency channel remains unchanged as it has a sufficiently high signal to noise ratio and can be successfully used for data communication. On the other hand, for the second time slot TS2, the operation frequency channel had to be changed from the one according to (e.g., stored in) S2[0] to the one according to (e.g., stored in) S2[1], since too many transmission failures were determined for the frequency channel corresponding to S2[0]. Thus, while the second operation frequency channel was compromised until hopping to a usable channel had been carried out, data could still be sent via the first operation frequency channel, thereby reducing longer periods of datastream interruption. Since the frequency channels according to S2[0] and S2[1] are in different sub-bands, the second operation frequency channel can quickly settle into a usable frequency channel by hopping, by avoiding interference sources with large frequency band. This shows the overall robustness of the communication protocol which can be used for communication of data in which time delays are critical.

Figure 9:
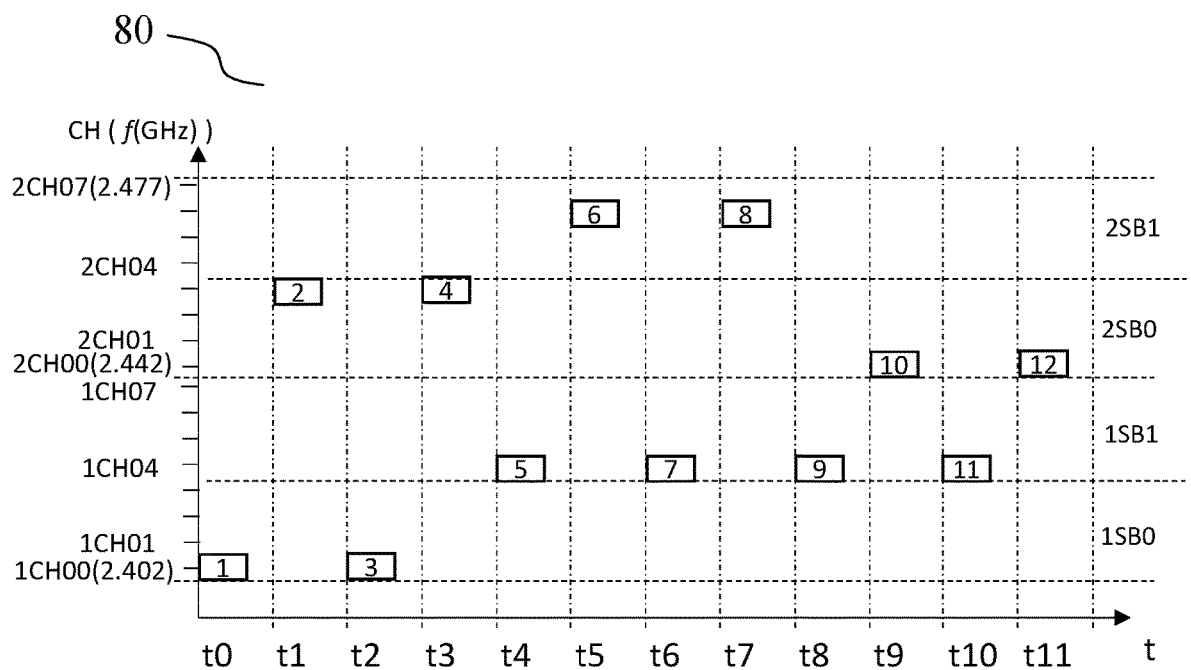
FIG. 9 shows a time diagram illustrating the operation frequency over time, in accordance with various embodiments.

FIG. 9 shows a time diagram 80 illustrating the operation frequency represented by the vertical axis over time which is represented by the horizontal axis, in accordance with various embodiments. Separation of the sub-bands is represented by the dashed horizontal lines and the sub-bands are named on the right side of the diagram, for illustration purposes. A first frequency band may be defined from 2.402 GHz to 2.441 GHz, including frequency channels 1CH00 to 1CH07 with centers spaced by 5 MHz and centered at 2.402, 2.407, . . . 2.437 GHz wherein the lower 4 frequency channels are included in the sub-band 1SB0 and the higher 4 frequency channels are included in the sub-band 1SB1. A second frequency band may be defined from 2.442 GHz and 2.480 GHz including frequency channels 2CH00 to 2CH07 with centers spaced by 5 MHz and centered at 2.442, 2.447, . . . , 2.477 GHz wherein the lower 4 frequency channels are included in the sub-band 2SB0 and the higher 4 frequency channels are included in the sub-band 2SB1. In the example of FIG. 9, the blocks with numbers represent frequency channels used and the numbers are added to represent the sequence of the data in the datastream, for ease of reference. The first frequency hopping sequence used for this example is S1=1CH0, 1CH4, . . . and the second frequency hopping sequence is S2=2CH3, 2CH6, 2CH0, . . . .

In FIG. 9, at time t0 during the first time slot TS1, data is sent via the frequency channel 1CH00 at 2.402 GHz being the first frequency channel and operating frequency channel. At time t1 during the second time slot TS2, data is sent via the frequency channel 2CH03 at 2.457 GHz being the second operation frequency channel and the operating frequency channel. Back to the first time slot TS1 at time t2, data is sent via the frequency channel 1CH00, followed by data sent via frequency channel 1CH04.

Before sending data at time t4, it is determined that data transmission using frequency channel 1CH00 was unsuccessful, meaning that the error condition becomes satisfied e.g., error count for 1CH00 has exceeded the threshold. Therefore, a frequency channel hopping takes place by selecting another frequency channel. As can be seen in the frequency scale, the next frequency channel 1CH04 selected as the operation frequency channel is not adjacent to 1CH00 but is selected from another sub-band, 1CH00 being in sub-band 1SB0 and 1CH04 being in sub-band 1SB1. Consequently, at time t4, frequency channel 1CH4 is used for sending data.

Before sending data at time t5, it is determined that data transmission using frequency channel 2CH03 was unsuccessful, meaning that the error condition becomes satisfied e.g., error count for 2CH03 has exceeded the threshold. Therefore, a frequency channel hopping takes place by selecting another frequency channel. As can be seen in the frequency scale, the next frequency channel 2CH06 selected as the operation frequency channel is not adjacent to 2CH03 but is selected from another sub-band, 2CH03 being in sub-band 2SB0 and 2CH06 being in sub-band 2SB1. Consequently, at time t5, frequency channel 2CH6 is used as operation frequency channel for sending data.

At time t6 data is sent via frequency channel 1CH04, and at time t7 data is sent via frequency channel 2CH06. At time t8 data is, again, sent via frequency channel 1CH04. At time t9 hopping frequency channel takes place by selecting frequency channel 2CH0, which is then used for sending data. It can be seen from the FIG. 9 that a suitable operation frequency has been found for the first time slot TS1 since no further frequency channel hopping takes place and data is sent via frequency channel 1CH04 at times t4, t6, t8, and t10.

While embodiments and examples are described starting at one time slot, for example, the first time slot TS1 or the second time slot TS2, the digital device may be configured to start communication at another time slot, for example, of the first time slot TS1 or the second time slot TS2. For example, both of the computer peripheral device and the receiver device may have a synchronized clock and an identical logic for the timeslot for a current clock's time.

According to various embodiments, the digital device may be a peripheral device, for example a human interface device HID such as a computer mouse 101 or a keyboard. For example, a cordless mouse or a cordless keyboard.

According to various embodiments, the digital device may be a communication unit included by and/or coupleable to a computer 10, for example a USB dongle 201.

Figure 10:
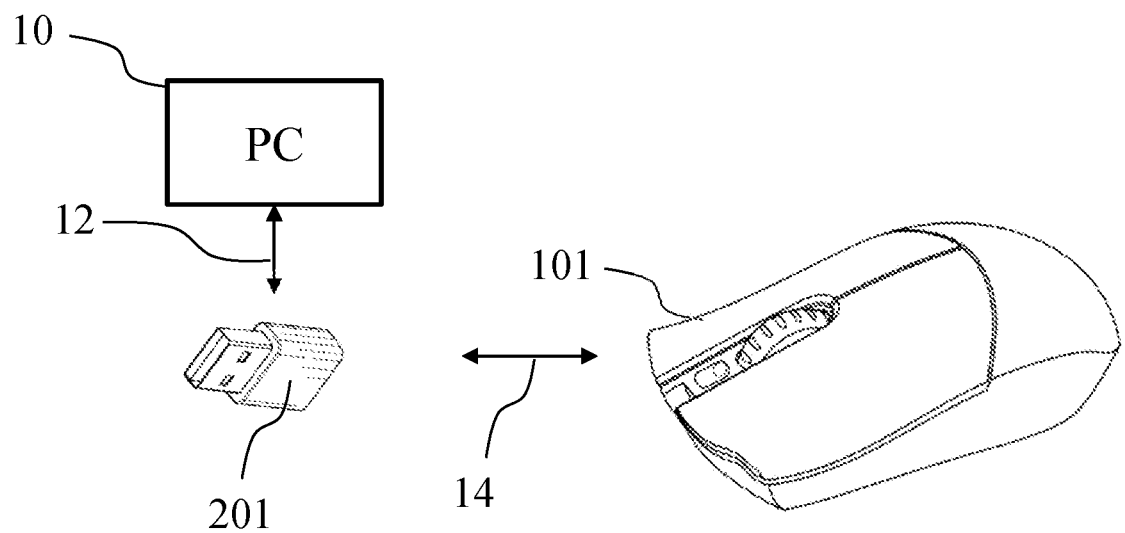
FIG. 10 shows a mouse 101 and a USB dongle 201 which connects to a computer 10, in accordance with some embodiments.

FIG. 10 shows a wireless communication system including a computer peripheral device 100 such as mouse 101, a communication unit 200, such as a USB dongle 201, which is couplable, for example electrically, mechanically, and in communication 12 with, a computer 10, in accordance with various embodiments.

According to various embodiments, one of the computer peripheral device 100 or the receiver device 200 may include a hopping sequence generator 250 configured to generate the first frequency hopping sequence S1 and the second frequency hopping sequence S2. According to various embodiments the hopping sequence generator 250 may be configured to dynamically update the first frequency hopping sequence S1 and the second frequency hopping sequence S2. According to various embodiments the hopping sequence generator 250 may be configured to send the first frequency hopping sequence S1 and the second frequency hopping sequence S2 via the operation frequency channel to the other one of the computer peripheral device 100 or the receiver device 200. According to various embodiments the first frequency channel selector 140 may be configured to store or update each of the first frequency hopping sequence S1 and the second frequency hopping sequence S2 with a new first frequency hopping sequence S1 and a new second frequency hopping sequence S2 received by the first receiver Rx1.

Figure 11:
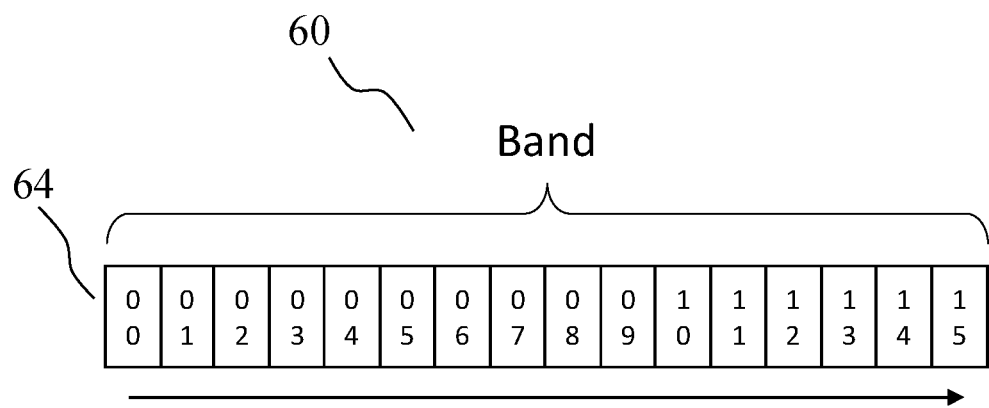
FIG. 11 shows a frequency scanning sequence in accordance with various embodiments.

FIG. 11 shows a frequency scanning sequence in accordance with various embodiments for a band 60 including frequency channels 64. The scanning may be, as an example, in sequence from a first frequency channel 00, such as the frequency channel with the lowest frequency in the band, to a last frequency channel 15, such as the frequency channel with the highest frequency in the band, or the other way around. 16 frequency channels are shown as illustration but the disclosure is not limited thereto. A condition is determined for each frequency channel, for example, for each frequency channel it may be determined the energy intensity of extraneous signal (i.e., signal not produced by the digital device nor intended to the signal device). After scanning is completed, the frequency hopping sequence may be generated (or updated) based on the determined conditions. The frequency channel may be sorted by condition, for example, according to some embodiments, the first position in a frequency hopping sequence may be for the best frequency channel (e.g., the frequency channel with the lowest extraneous signal), followed by the second-best frequency channel, and so on. In addition to the sorting, the frequency hopping sequence takes the sub-band hopping into consideration as previously explained, such that any position in a frequency hopping sequence does not have a neighbor from the same sub-band. While the example of FIG. 11 shows a simple scanning frequency for a single frequency band, it is understood that this frequency scanning may be different (e.g., using frequency channels of mixed order, or reverse order) and the scanning may be applied to each of the first frequency band B1 and the second frequency band B2.

Figure 12:
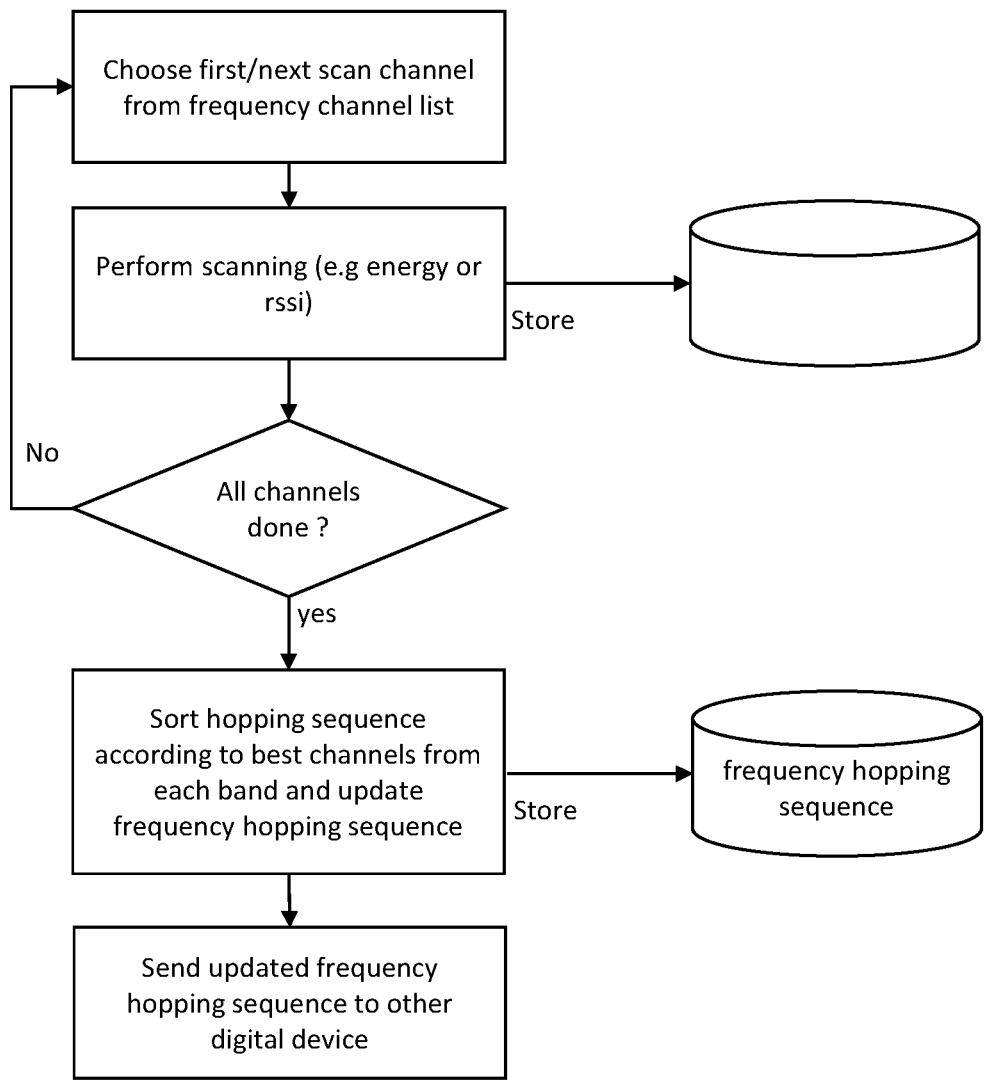
FIG. 12 shows a method for generating the frequency hopping sequence, in accordance with various embodiments.

FIG. 12 shows a method for generating the frequency hopping sequence, which can be, e.g., the first frequency hopping sequence and/or the second frequency hopping sequence, in accordance with various embodiments. A frequency channel is chosen, for example the first frequency channel of a frequency band, and a scanning is performed to determine the condition of the frequency channel, for example to determine energy intensity, or a rssi, which condition is stored in a memory. This procedure is repeated for all frequency channels, and once all the frequency channels have been scanned, the frequency hopping sequence may be sorted according to the best frequency channels taking into consideration sub-band hopping. The digital device, e.g. the receiver device, may then send the new frequency hopping sequence to the other digital device, e.g., the computer peripheral device, such that both have synchronized frequency hopping sequences. According to various embodiments, frequency hopping sequences can be sent as first data. For example, specific codes can be used to differentiate between different kinds of data.

According to various embodiments the communication unit may be configured to generate the first frequency hopping sequence S1 and the second frequency hopping sequence S2, and transmit the first frequency hopping sequence S1 and the second frequency hopping sequence S2 to the peripheral device. The computer peripheral device may be configured to receive the first frequency hopping sequence S1 and the second frequency hopping sequence S2 from the communication unit.

Present embodiments also concern a method for wirelessly connecting an HID with a host computer. The method may include generating data packets in response to a user input. The method may further include transmitting the data packets, from a transmitter of the HID to a receiver of the host computer, on a first frequency channel within a first plurality of frequency channels, e.g., low-frequency group or on a second frequency channel within a first plurality of frequency channels, e.g., high frequency group. The low-frequency group or the high-frequency group each includes a number of sub-bands, each sub-band further includes a number of frequency channels. The method may further include determining whether an acknowledgement for reception of the data packet is received in the transmitter, wherein the data packet is re-transmitted if it is determined that an acknowledgement for reception of the data packet is not received in the transmitter. The method may further include determining that a number of re-transmitting under the first or second frequency is more than a threshold value, changing the first or second frequency to another frequency channel based on a frequency hopping sequence, for example a dynamic frequency hopping sequence. The frequency hopping sequence may be constructed by choosing one frequency channel from each band of the low-frequency or high-frequency group. The data packets may be transmitted on the first frequency within the low-frequency group and on the second frequency within the high-frequency group alternatively. The low-frequency group or the high-frequency group may each includes four bands, each band may further include four frequency channels.

Embodiments disclosed herein use interference avoidance method to mitigate radio frequency interference on wireless hid device data transmission. Two frequency hopping sequences are employed concurrently. The frequency hopping sequences may be employed alternatively based on time slot and the frequency channels in these two sequences are not overlapped. Having separate and non-overlapping frequency bands improves the system performance when it is interfered by a fixed frequency interference with large frequency bandwidth as the non-overlapping band will provide frequency diversity advantage. In examples, the frequency hopping sequence is updated dynamically. A digital device, e.g., a dongle, may scan the frequency channels in the background. New channels may be selected, and the updated list is transmitted to the hid devices.

According to various embodiments, a computer-readable medium may be provided. The computer-readable medium may include instructions which, when executed by a computer, make the computer perform the wireless data communication method as explained herein in accordance with various embodiments.

In one aspect, a system of a computer peripheral device and a receiver device is envisaged, including a computer peripheral device as explained herein in accordance with various embodiments and further including a receiver device explained herein in accordance with various embodiments, wherein the computer peripheral device and the receiver device are configured to communicate with each other.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed:

1. A computer peripheral device (100) comprising computer peripheral function circuitry (101) to provide one or more predefined peripheral functions to a computer (10);
a human interface to receive and/or to present data from or to a user;
an encoder (110) to encode a datastream using the data;
a communication circuitry configured to implement a wireless data communication with a receiver device (200) to couple to the computer (10), the communication circuitry further configured to:
transmit the datastream in accordance with a wireless communication protocol, wherein the communication protocol operates with a first frequency band (B1) and a second frequency band (B2), which are non-overlapping, one being located in a lower frequency range than the other, wherein each of the first and second frequency bands (B1, B2) is divided into a plurality of sub-bands, and wherein each sub-band of the plurality of sub-bands is further divided into a plurality of frequency channels,
wherein the communication circuitry is configured to transmit data of the datastream via an operation frequency channel (14) during a first time slot (TS1) and a second time slot (TS2), wherein the first time slot (TS1) and the second time slot (TS2) have fixed durations and alternate in a periodic sequence; and
a first frequency channel selector (140) configured to:
select a first operation frequency channel (1CHn) according to a first frequency hopping sequence (S1) from one frequency channel of the plurality of frequency channels of one sub-band of the plurality of sub-bands (1SB) of the first frequency band (B1),
select the first operation frequency channel (1CHn) as a next first operation frequency channel (1CHnp1) of the first frequency hopping sequence (S1) due to a first error condition becoming satisfied,
select a second operation frequency channel (2CHn) according to a second frequency hopping sequence (S2) from one frequency channel of the plurality of frequency channels of one sub-band of the plurality of sub-bands (2SB) of the second frequency band (B2), and
select the second operation frequency channel (2CHn) as a next second operation frequency channel (2CHnp1) due to a second error condition becoming satisfied,
wherein the operation frequency channel (14) is the first operation frequency channel (1CHn) during the first time slot (TS1) and the second operation frequency channel (2CHn) during the second time slot (TS2), and
wherein any two adjacent frequency channels of the first frequency hopping sequence (S1) or any two adjacent frequency channels of the second frequency hopping sequence (S2) are of different sub-bands.

2. The computer peripheral device (100) of claim 1, further comprising:
a first transmitter (Tx1) configured to transmit first data (UL1) of the datastream over the operation frequency channel (14); and
a first receiver (Rx1) configured to receive second data (DL1).

3. The computer peripheral device (100) of claim 2, further comprising a comparator configured to carry out a determination whether the second data (DL1) comprises a confirmation (ACK1, ACK2) of receipt of the first data (UL1) by the receiver device (200) for the respective time slot.

4. The computer peripheral device (100) of claim 3, wherein the first error condition becomes satisfied when the determination fails to confirm the receipt of the first data (UL1) for the first operation frequency channel (1CHn), and a count of determination failures for said frequency channel exceeds a first pre-determined threshold.

5. The computer peripheral device (100) of claim 3, wherein the second error condition becomes satisfied when the determination fails to confirm the receipt of the first data (UL1) for the second operation frequency channel (2CHn), and a count of determination failures for said frequency channel exceeds a second pre-determined threshold.

6. The computer peripheral device (100) of claim 1, wherein each of the first time slot (TS1) and the second time slot (TS2) has a same fixed duration selected from 10 microseconds to 10 milliseconds.

7. The computer peripheral device (100) of claim 1, further comprising a hopping sequence generator (250) configured to generate the first frequency hopping sequence (S1) and the second frequency hopping sequence (S2).

8. The computer peripheral device (100) of claim 7, wherein the hopping sequence generator (250) is configured to dynamically update the first frequency hopping sequence (S1) and the second frequency hopping sequence (S2).

9. The computer peripheral device (100) of claim 7, wherein the hopping sequence generator (250) is configured to transmit the first frequency hopping sequence (S1) and the second frequency hopping sequence (S2) over the operation frequency channel to the receiver device (200).

10. The computer peripheral device (100) of claim 1, wherein the first frequency channel selector (140) is configured to store or update each of the first frequency hopping sequence (S1) and the second frequency hopping sequence (S2) with a new first frequency hopping sequence (S1) and a new second frequency hopping sequence (S2) received by a first receiver (Rx1) from the receiver device (200).

11. The computer peripheral device (100) of claim 1 being a human interface device such as a computer mouse (101) or a keyboard.

12. A receiver device (200) being coupleable to a computer (10), and including a communication circuitry configured to implement a wireless data communication with the computer peripheral device (100) according to claim 1.

13. The receiver device (200) of claim 12, further comprising a determination circuit to carry out a determination whether first data (UL1) was received and transmit a confirmation (ACK1, ACK2) of receipt of the first data (UL1) to the computer peripheral device (100).

14. A wireless data communication method (300), for communication between a computer peripheral device (100) and a receiver device (200), comprising:
transmitting a datastream (350) from a computer peripheral device (100) to a receiver device (200), in accordance with a wireless communication protocol,
wherein the communication protocol operates with a first frequency band (B1) and a second frequency band (B2), which are non-overlapping, one being located in a lower frequency range than the other, wherein each of the first and second frequency bands (B1, B2) is divided into a plurality of sub-bands, and wherein each sub-band of the plurality of sub-bands is further divided into a plurality of frequency channels,
wherein transmitting the datastream in accordance with the wireless communication protocol comprises
transmitting data of the datastream via an operation frequency channel during a first time slot (TS1) and a second time slot (TS2), wherein the first time slot (TS1) and the second time slot (TS2) have fixed durations and alternate in a periodic sequence;
wherein, during the first time slot (TS1), the operation frequency channel is a first operation frequency channel (1CHn) selected according to a first frequency hopping sequence (S1) from one frequency channel of the plurality of frequency channels of one sub-band of the plurality of sub-bands (1SB) of the first frequency band (B1),
wherein the first operation frequency channel (1CHn) is selected as a next first operation frequency channel (1CHnp1) of the first frequency hopping sequence (S1) due to a first error condition becoming satisfied,
wherein during the second time slot (TS2), the operation frequency channel is a second operation frequency channel (2CHn) selected according to a second frequency hopping sequence (S2) from one frequency channel of the plurality of frequency channels of one sub-band of the plurality of sub-bands (2SB) of the second frequency band (B2),
wherein the second operation frequency channel (2CH) is selected as a next second operation frequency channel (2CHnp1) due to a second error condition becoming satisfied,
wherein any two adjacent frequency channels of the first frequency hopping sequence (S1) or any two adjacent frequency channels of the second frequency hopping sequence (S2) are of different sub-bands.

15. The wireless data communication method (300) of claim 14, wherein each of the first time slot (TS1) and the second time slot (TS2) has a fixed duration selected from 10 microseconds to 10 milliseconds.

16. The wireless data communication method (300) of claim 14, wherein, when a count of failed transmissions has exceeded a pre-determined threshold for the operation frequency channel, the first error condition has become satisfied.

17. The wireless data communication method (300) of claim 16, wherein the count of failed transmissions is carried out concurrently by the computer peripheral device (100) and by the receiver device (200).

18. The wireless data communication method (300) of claim 14, wherein selecting the first operation frequency channel (1CHn) as a next first operation frequency channel (1CHnp1) or selecting the second operation frequency channel (2CHn) as a next second operation frequency channel (2CHnp1) is carried out by a first frequency channel selector (140) comprised by the computer peripheral device (100), and concurrently, by a second frequency channel selector (240) comprised by the receiver device (200).

19. The wireless data communication method (300) of claim 14, wherein the peripheral device (100) is human interface device such as a computer mouse (101) or a keyboard.

20. The wireless data communication method (300) of claim 14, wherein the receiver device (200) is a USB dongle (201).

* * * * *